United States Patent [19]
Piret

[11] 3,916,727
[45] Nov. 4, 1975

[54] VEHICLE TRANSMISSIONS
[75] Inventor: Jean Piret, Bougival, France
[73] Assignees: Regie Nationale des Usines RENAULT, Billancourt; Automobiles PEUGEOT, Paris, both of France
[22] Filed: June 10, 1974
[21] Appl. No.: 477,634

[30] Foreign Application Priority Data
July 9, 1973 France .............................. 73.25106

[52] U.S. Cl. ...................... 74/688; 74/730; 74/763; 74/762
[51] Int. Cl.² F16H 47/08; F16H 47/00; F16H 57/10
[58] Field of Search ............. 74/688, 687, 762, 763, 74/730, 732

[56] References Cited
UNITED STATES PATENTS

| 3,107,553 | 10/1963 | Tuck | 74/688 |
| 3,482,469 | 12/1969 | Mori | 74/763 |
| 3,554,057 | 1/1971 | Michnay et al. | 74/732 |
| 3,648,544 | 3/1972 | Tanaka | 74/730 |
| 3,741,037 | 6/1973 | Piret | 74/763 |

FOREIGN PATENTS OR APPLICATIONS
| 695,916 | 10/1964 | Canada | 74/688 |

Primary Examiner—Samuel Scott
Assistant Examiner—P. S. Lall
Attorney, Agent, or Firm—Fitzpatrick, Cella, Harper & Scinto

[57] ABSTRACT

This invention relates to automatic transmissions for vehicles, and particularly to transmissions which consist of a planetary gear train, a hydrodynamic torque-converter and a differential, the mechanism being housed in a main housing and the converter being housed in a second housing, these housings being separable along a plane perpendicular to the axis of rotation of the gear train: such transmissions also incorporate braking and clutch members including friction discs which are controlled by rams which co-operate with the components of the planetary gear train, and a pump is provided to supply said ram for controlling the braking and clutch methods. In accordance with the invention, the said main housing of the mechanism contains a detachable partition and bearing support having a front face which is directed towards the converter housing, and a rear face which forms a contact surface for friction discs included in the braking member and for return members of a piston of a ram means which controls said braking member.

5 Claims, 2 Drawing Figures

VEHICLE TRANSMISSIONS

BACKGROUND OF THE INVENTION

The present invention relates to automatic transmissions for vehicles and in particular to transmission which consist of a planetary gear train, a hydrodynamic torque-converter, and a differential.

In the case of a power unit in which the automatic transmission is arranged transversely to the axis of the vehicle it has proved preferable and advantageous to use a main housing containing the planetary gear train and the differential and to connect the said main housing to the converter housing. In a transmission of this kind it is impossible to fit and check the mechanism unless a cover is provided at the end of the main housing, which therefore has to have a joint face and to include provision for ensuring that the pipes supplying the clutch are tightly sealed.

It is an object of the invention to improve such constructions.

SUMMARY OF THE INVENTION

In accordance with the present invention, the main housing of the mechanism incorporates a detachable partition and bearing support, the front face of which is directed towards the converter housing and the rear face of which forms a contact surface for the friction discs of a braking member and for the return members of the piston of a ram which controls the said braking member.

Such an arrangement fulfills the object of the invention since it reduces the axial dimensions of the mechanism, allows the mechanism to be fitted and checked easily, and makes it possible to seal the housings more satisfactorily due to the fact that the cover at the end of the main housing is done away with.

BRIEF DESCRIPTION OF THE DRAWINGS

Other features and advantages of the invention will be better understood from perusal of the following description of one embodiment thereof with reference to the accompanying drawings, in which.

DETAILED DESCRIPTION OF A PREFERRED EMBODIMENT

Figure 1:
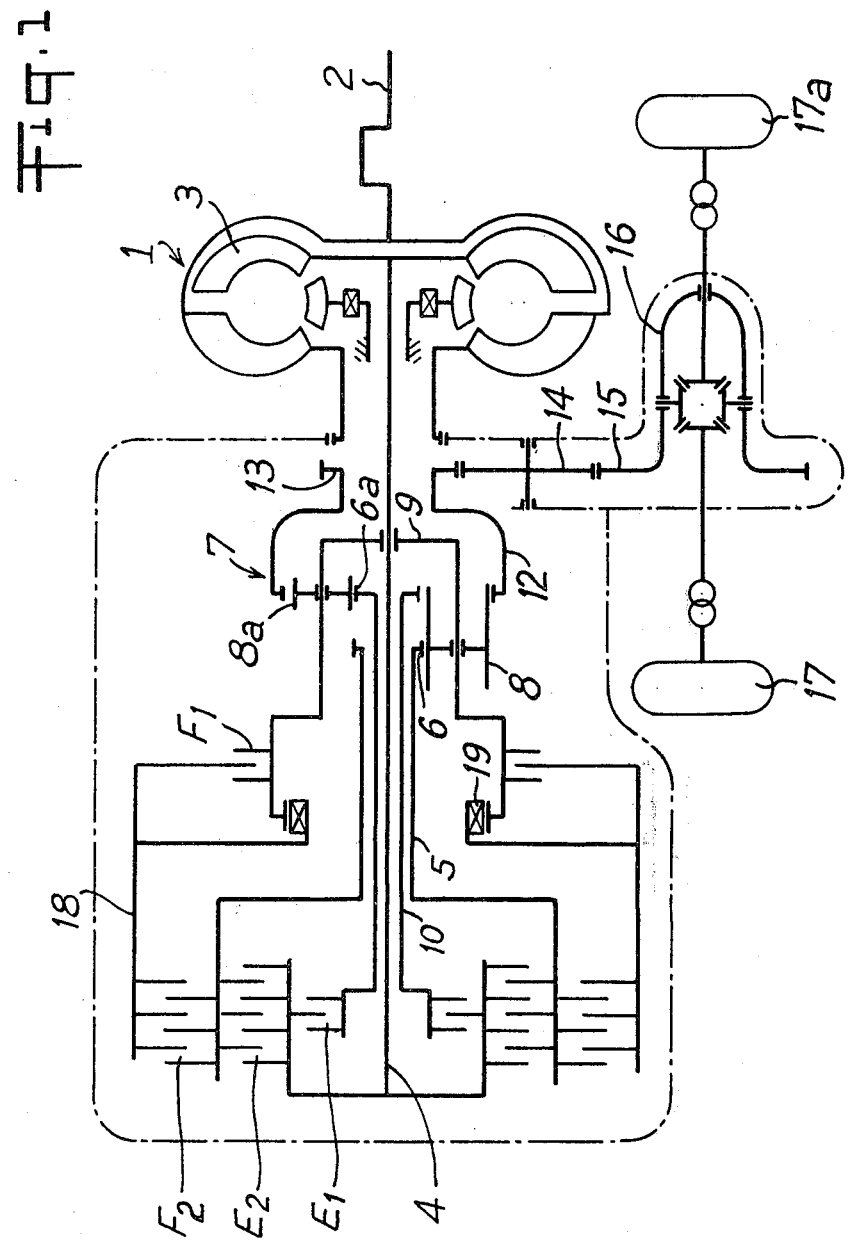
FIG. 1 is a schematic view of an automatic transmission mechanism for a vehicle.

In FIG. 1 of the accompanying drawings is shown an automatic vehicle transmission which consists of a hydrodynamic torque-converter 1 which is fitted on the end of the crank-shaft 2 of a motor, the said converter having an output member 3 or turbine which is secured to the input shaft 4 of the mechanism. The input shaft is capable of being coupled by means of a clutch member to a hollow shaft 10 which carries a sun-wheel 6a forming part of a planetary gear train 7, the said train consisting of two sets of planet wheels 8, 8a of different lengths which are mounted so as to be free to rotate on a cage 9, the planet wheels in the first set engaging with the planet-wheels in the second set. The set of planet wheels 8 meshes with sun-wheel 6, while the other set of planet wheels 8a meshes with a sun-wheel 6a which is keyed to the end of the hollow shaft 10.

Planet wheels 8 mesh with an annular gear 12 which carries a pinion 13 which is connected by a pinion 14 to an annular gear which forms a part of a differential 16 which drives the wheels 17, 17a of a vehicle.

Clutch members $E_1$ and $E_2$ are arranged on the one hand between shafts 4 and 10 and on the other between shafts 5 and 4, while a braking member $F_2$ is arranged between shaft 5 and a fixed member 18 secured to the housing, and a braking member $F_1$ is arranged between the said fixed member 18 and cage g. In addition, a free-wheel 19 is inserted between the fixed member 18 and the cage 9.

This arrangement allows three forward and one reverse ratio to be obtained at the output pinion 13.

Figure 2:
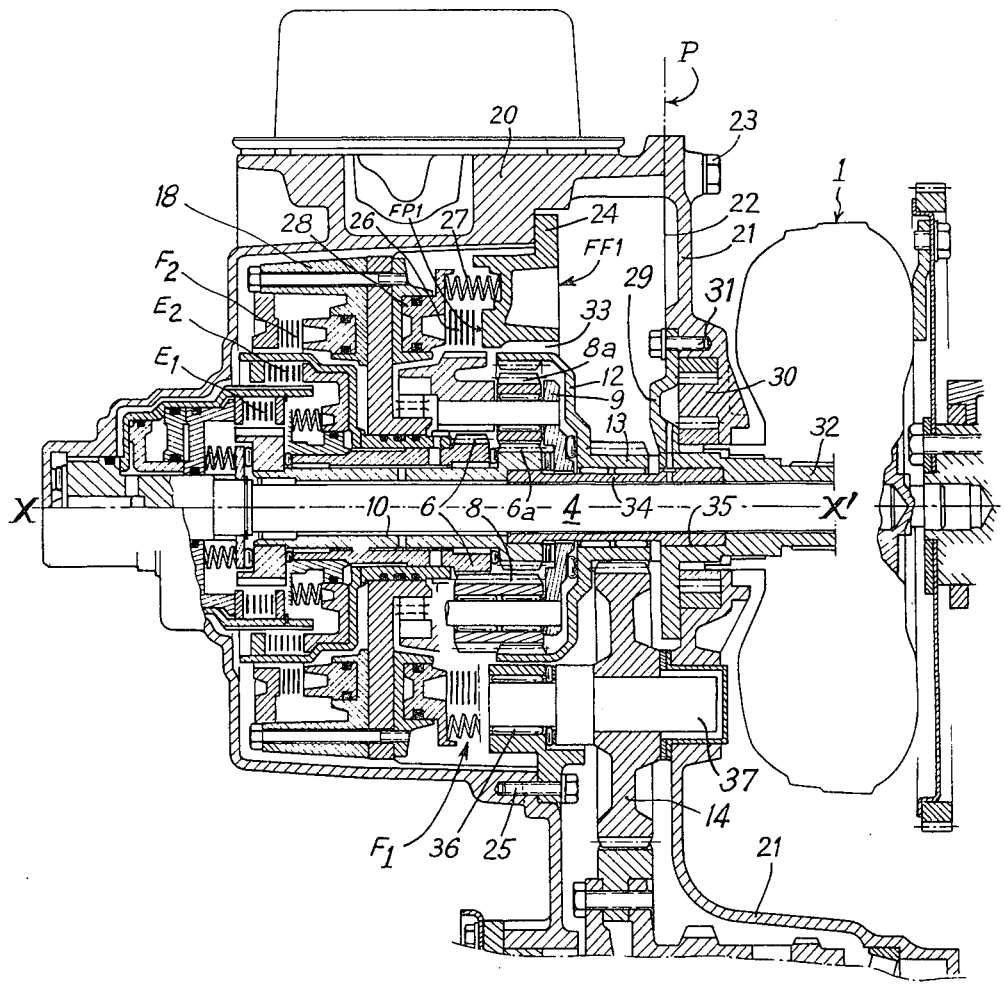
FIG. 2 is a partly sectional view of the improved mechanism according to the invention.

As shown in FIG. 2, the mechanism consisting of the planetary gear train and the transmission to the differential is arranged in a main housing 20 and the converter 1 is arranged in a housing 21. Housings 20 and 21 are fixed together by screws 23 and have a common connecting face 22 which lies in the junction plane P, which is perpendicular to the longitudinal axis $XX_1$ of the mechanism.

In accordance with the invention, a detachable partition 24 is fixed to the main housing 20 by means of screws 25. The front face $FF_1$ of the partition 19 is directed towards housing 21 while the rear face $FP_1$ of the said partition forms a contact face for the discs 26 of the braking member $F_1$ and for the return springs 27 of the piston 28 of a ram which controls the braking member $F_1$.

In the space which exists between partition 24 and connecting face 22 is mounted the cover 29 of a gear-pump 30 which is secured by screws 31 to housing 21, the said pump being intended for lubrication purposes and to supply the converter and the various control rams. Cover 29 has integral with it a first sleeve 32 which extends axially in the direction of the converter and carries the inner ring of the free-wheel for the stator of the converter.

In accordance with another feature of the invention, the partition 24 contains a recess 33 in which are arranged co-axial components of the transmission which are situated at increasing distances from the longitudinal axis of the mechanism and which consist of the input shaft 4, sun-wheel 6a, cage 9, and annular gear 12. The annular gear 12 of the planetary train is carried by the output pinion 13 which turns on a second sleeve 34 mounted on shaft 4, one end of the said sleeve fitting into a seating 35 in the cover 29 of pump 30 and its other end forming a bearing for the sun-wheel 6a which meshes with the set of planet wheels 8a.

In partition 24 is provided a bearing 36 in which a shaft 37 which carries pinion 14 is mounted to rotate.

Various modifications may, of course, be made by the man skilled in the art to the arrangement or methods which have just been described simply as non-limiting examples, without departing from the scope of the invention as defined by the appended claims.

I claim:

1. In an automatic vehicle transmission of the kind comprising of a planetary gear train transmission mechanism, a hydrodynamic torque-converter, a differential, a main housing for said mechanism and a main housing for said converter these latter being separable along a plane perpendicular to the axis of rotation of said gear train, braking and clutch members including friction discs which are controlled by ram means which co-operate with the components of said planetary gear train, and a pump to supply said ram means, the improvement wherein said main housing contains a detachable partition and bearing support having a front face which is directed towards said converter housing, and a rear face which forms a contact surface for said friction discs included in said braking member and for return members of a piston of said ram means.

2. A transmission according to claim 1, wherein said detachable partition is recessed, and in said recess are arranged co-axial components of said transmission mechanism, said components being situated at increasing distances from the longitudinal axis of said mechansim.

3. A transmission according to claim 2, wherein said planetary gear train includes a ring gear arranged in said recess in said partition, said ring gear being carried by an output pinion of said mechanism which turns on a sleeve which latter forms a bearing for the forward-sun-gear of said planetary gear train, said forward-sun-gear meshing with a set of planetary gears, said sleeve being mounted directly in a cover of a pump which is fixed to said converter housing.

4. A transmission according to claim 1, wherein said partition contains a bearing in which a shaft of an intermediate transmission pinion is mounted to rotate.

5. A transmission according to claim 1, wherein said main housing has a single assembly and sealing joint lying in the junction plane between said housings for said converter and said mechanism.

* * * * *